United States Patent
Chen et al.

(10) Patent No.: US 9,909,496 B2
(45) Date of Patent: Mar. 6, 2018

(54) POWER GENERATION SYSTEM (71) Applicant: WUHAN KAIDI ENGINEERING TECHNOLOGY RESEARCH INSTITUTE CO., LTD., Wuhan (CN)

(72) Inventors: Yilong Chen, Wuhan (CN); Yanfeng Zhang, Wuhan (CN); Hongming Tang, Wuhan (CN); Wenyan Liu, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 15/289,991

(22) Filed: Oct. 11, 2016

(65) Prior Publication Data
US 2017/0030264 A1  Feb. 2, 2017

Related U.S. Application Data (63) Continuation-in-part of application No. PCT/CN2015/072397, filed on Feb. 6, 2015.

(30) Foreign Application Priority Data

Apr. 11, 2014 (CN) .......................... 2014 1 0144008

(51) Int. Cl.
*F01D 15/10* (2006.01)
*F02C 6/00* (2006.01)
(Continued)

(52) U.S. Cl.
CPC ................ *F02C 3/28* (2013.01); *F01D 15/10* (2013.01); *F01K 3/18* (2013.01); *F01K 27/00* (2013.01); *F02C 3/04* (2013.01); *F03G 6/02* (2013.01); *H02K 7/1823* (2013.01); *F05D 2210/12* (2013.01); *F05D 2220/76* (2013.01); *Y02E 10/46* (2013.01); *Y02E 20/14* (2013.01); *Y02E 20/18* (2013.01); *Y02E 50/12* (2013.01)

(58) Field of Classification Search
USPC ............................... 290/52; 60/39.15, 641.8
See application file for complete search history.

(56) References Cited

U.S. PATENT DOCUMENTS 7,191,597 B2 * 3/2007 Goldman ................ F01K 13/00
60/641.12
9,032,731 B2 * 5/2015 Halas ..................... B82Y 30/00
60/641.15

(Continued)

*Primary Examiner* — Pedro J Cuevas
(74) *Attorney, Agent, or Firm* — Matthias Scholl P.C.; Matthias Scholl (57) ABSTRACT

A power generation system, including: a solar energy concentration system, a biomass gasification device, a gas-powered generator, a steam turbine, a steam-powered generator. The solar energy concentration system is connected to a solar energy heat exchange system. The biomass gasification device is connected to the gas-powered generator. The gas outlet of the gas turbine is connected to the gas exhaust heat system. The second steam outlet of the gas exhaust heat system is connected to the second and the third cylinders of the steam turbine. The first steam outlet of the gas exhaust heat system and the steam outlet of the solar energy heat exchange system are connected to a steam mixing regulating system. The mixed steam outlet of the steam mixing regulating system is connected to the first cylinder of the steam turbine.

20 Claims, 3 Drawing Sheets

(51) Int. Cl.

| | | |
|---|---|---|
| *H02K 7/18* | (2006.01) | |
| *H02P 9/04* | (2006.01) | |
| *F02C 3/28* | (2006.01) | |
| *F03G 6/02* | (2006.01) | |
| *F01K 27/00* | (2006.01) | |
| *F01K 3/18* | (2006.01) | |
| *F02C 3/04* | (2006.01) | |
| *F02G 1/00* | (2006.01) | |
| *B60K 16/00* | (2006.01) | |
| *B60L 8/00* | (2006.01) | |

(56) References Cited

U.S. PATENT DOCUMENTS

| | | | | |
|---|---|---|---|---|
| 9,046,307 | B2 * | 6/2015 | Luz | F28D 20/00 |
| 9,739,473 | B2 * | 8/2017 | Halas | B24B 49/105 |
| 2007/0012041 | A1 * | 1/2007 | Goldman | F01K 13/00 |
| | | | | 60/641.8 |
| 2012/0153621 | A1 * | 6/2012 | Halas | B82Y 30/00 |
| | | | | 290/52 |
| 2012/0159922 | A1 * | 6/2012 | Gurin | F01K 23/06 |
| | | | | 60/39.15 |
| 2012/0159956 | A1 * | 6/2012 | Gurin | F01K 23/06 |
| | | | | 60/767 |
| 2012/0174558 | A1 * | 7/2012 | Gurin | F01K 23/06 |
| | | | | 60/39.63 |
| 2012/0267893 | A1 * | 10/2012 | Halas | B24B 49/105 |
| | | | | 290/52 |
| 2016/0045841 | A1 * | 2/2016 | Kaplan | B01J 19/0093 |
| | | | | 429/49 |

\* cited by examiner

POWER GENERATION SYSTEM

CROSS-REFERENCE TO RELATED APPLICATIONS

This application is a continuation-in-part of International Patent Application No. PCT/CN2015/072397 with an international filing date of Feb. 6, 2015, designating the United States, now pending, and further claims priority benefits to Chinese Patent Application No. 201410144008.5 filed Apr. 11, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a power generation system.

Description of the Related Art

Existing power generation systems combining solar energy and natural gas impose high requirements on the construction of the power plants. The power plants require large investment, and is highly dependent on the conventional fossil energy which is nonrenewable. This increases the difficulty to popularize the power generation systems.

SUMMARY OF THE INVENTION

In view of the above-described problems, it is one objective of the invention to provide a power generation system integrated with solar energy and biomass integrated gasification combined cycle (BIGCC). The system utilizes the characteristics of the sliding parameter operation and the Rankine cycle of the steam of the BIGCC to integrate the light and the heat of the solar energy to the Rankine cycle of the steam of the BIGCC, so that a power generation system involving step utilization of integration of the double energy resources and double cycles is formed, the problems of low temperature, and intermittence and instability of the solar energy supply existing in the through type photothermal steam power generation.

To achieve the above objective, in accordance with one embodiment of the invention, there is provided a power generation system, the system comprising: a solar energy concentration system, a biomass gasification device, a gas-powered generator, a steam turbine, a steam-powered generator, a solar energy heat exchange system comprising a steam outlet, a first compressor, a combustion chamber, a gas turbine comprising a gas outlet, a gas exhaust heat system, and a steam mixing regulating system comprising a mixed steam outlet. The steam turbine comprises a first cylinder, a second cylinder, and a third cylinder; and pressures of the first cylinder, the second cylinder, and the third cylinder respectively decrease. The gas exhaust heat system comprises a first steam outlet and a second steam outlet, and a pressure of the first steam outlet is higher than a pressure of the second steam outlet. The solar energy concentration system is connected to the solar energy heat exchange system. The biomass gasification device is connected to the gas-powered generator via the first gas compressor, the combustion chamber, and the gas turbine. The gas outlet of the gas turbine is connected to the gas exhaust heat system. The second steam outlet of the gas exhaust heat system is connected to the second and the third cylinders of the steam turbine. The first steam outlet of the gas exhaust heat system and the steam outlet of the solar energy heat exchange system are connected to the steam mixing regulating system. The mixed steam outlet of the steam mixing regulating system is connected to the first cylinder of the steam turbine.

In a class of this embodiment, the steam mixing regulating system comprises a mixer housing. A steam ejection pipe is protruded from a rear end of the mixer housing into a middle-front part of a cavity of the mixer housing. A front end of the steam ejection pipe is sealed, steam nozzles are distributed on a front part of a pipe wall of the steam ejection pipe, and a first steam inlet for introducing in steam from the gas exhaust heat system is disposed at a rear end of the steam ejection pipe. A water ejection pipe is installed inside the first steam inlet in a rear part of the steam ejection pipe. Water nozzles are distributed on a part of the water ejection pipe extended into the steam ejection pipe, and an inlet of the water ejection pipe is disposed at an end thereof outside the steam ejection pipe and connected to a solenoid valve. A second steam inlet for introducing in steam from the solar energy heat exchange system is disposed on an outer wall of a rear part of the mixer housing. A temperature detector is disposed on an outer wall of a front part of the mixer housing. A probe of the temperature detector is extended into the cavity of the mixer housing. A signal wire of the temperature detector is connected to a temperature controller. A control output terminal of the temperature controller is connected to the solenoid valve disposed at the end of the water ejection pipe outside the steam ejection pipe. A front end of the mixer housing is the mixed steam outlet.

In a class of this embodiment, a liner tube is disposed in a middle-rear part of the steam ejection pipe; the liner tube is disposed between the first steam inlet and a distributed region of the steam nozzles. Outer rings at two ends of the liner tube are sealed from the mixer housing.

In a class of this embodiment, the solar energy heat exchange system comprises: a heater, an evaporator, and a superheater. The superheater is connected to a conductive oil system of the solar energy concentration system; an oil pipe passes through the evaporator and the heater. An oil outlet is disposed on the heater and connected to an oil return port of the conductive oil system of the solar energy concentration system. A water pipe is disposed inside the heater, and the water pipe is connected to an internal of the evaporator; a steam-water separator is disposed at an upper end of the evaporator. A steam outlet of the steam-water separator is connected to a steam pipe, the steam pipe passes through the superheater, and an outlet of the steam pipe is connected to the steam mixing regulating system.

In a class of this embodiment, a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

In a class of this embodiment, the system further comprises a solar energy heat storage system; and the solar energy heat storage system is respectively connected to the solar energy heat exchange system and the solar energy concentration system.

Advantages of a power generation system according to embodiments of the invention are summarized as follows:

1. A new power generation system integrated with light and heat of the solar energy, biomass gasification, gas-steam combined cycle (BIGCC) is established, so that the combined power generation mode of the double energy sources of the light and the heat of the solar energy and the biomass, and the stacked double cycles of the Brayton cycle of the gas turbine and the Rankine cycle of the steam are realized.

2. Compared with the complement of the light and heat into the regenerative system of the gas turbine, the photothermal utilization of the system of the invention is effective multi-step and step utilization process including heating, evaporating, and superheating of the working medium.

3. The heat source of the BIGCC system is utilized, the configuration of the photothermal power generation is simplified, the light field is not configured with auxiliary heating device or turbines or electric generator that adopts the photothermal steam and the exhaust heat steam of the BIGCC, so that the investment into the photothermal power generation device is reduced.

4. The steam mixing regulating system is configured, so that the mixing of steams of different temperatures is realized. In addition, the temperature of the mixed steam is regulated to meet the steam requirement on the steam turbine of sliding parameters.

5. By configuration of the heat storage and the system integration, the intermittence and instability of the solar energy supply are effectively solved.

6. Based on the clean and effective system platform of the BIGCC, the efficiency of the photothermal power generation is improved. The steam turbine and the auxiliary heating device for the photothermal power generation and the system investment thereof are saved, the investment production of the photothermal power generation are reduced. The biomass resource in the proximity of the power plant is utilized, thus making ISCC independent from the natural gas resource and the supply network. In addition, the light and the heat are effectively complemented, the installed capacity of the combined power plant, and the economic benefit and the environmental benefit of the combined power plant are improved.

7. The combined power plant is made independent from the natural gas resource and the supply network.

8. The replenishment of the light and the heat is adopted, the installed capacity of the combined power plant is enlarged, and the economic and environmental benefits of the power plant are improved.

BRIEF DESCRIPTION OF THE DRAWINGS

The invention is described hereinbelow with reference to the accompanying drawings, in which.

In the drawings, the following reference numbers are used: 1. Biomass gasification device; 2. Gas purification device; 3. First gas compressor; 4. Second gas compressor; 5. Combustion chamber; 6. Gas turbine; 7. Gas-powered generator; 8. Gas exhaust heat system; 9. Solar energy concentration system; 10. Solar energy heat storage system; 11. Solar energy heat exchange system; 12. Steam mixing regulating system; 13. Steam turbine; and 14. Steam-powered generator.

DETAILED DESCRIPTION OF THE EMBODIMENTS

For further illustrating the invention, experiments detailing a power generation system are described below. It should be noted that the following examples are intended to describe and not to limit the invention.

Combined with a Rankine cycle as a bottom cycle of BIGCC and the characteristics of the operation of the sliding-parameters of the steam turbine, a system of the steam mixing regulating system is established. A through type solar energy photothermal steam and the afterheat steam of the BIGCC are mixed, and a temperature of a resulting mixed steam is regulated, then the mixed steam is utilized as a primary steam and sent to a steam turbine to do work while expanding, thus driving the generator for power generation and realizing power generation of both the solar energy photothermal steam and the afterheat steam of the BIGCC.

Figure 1:
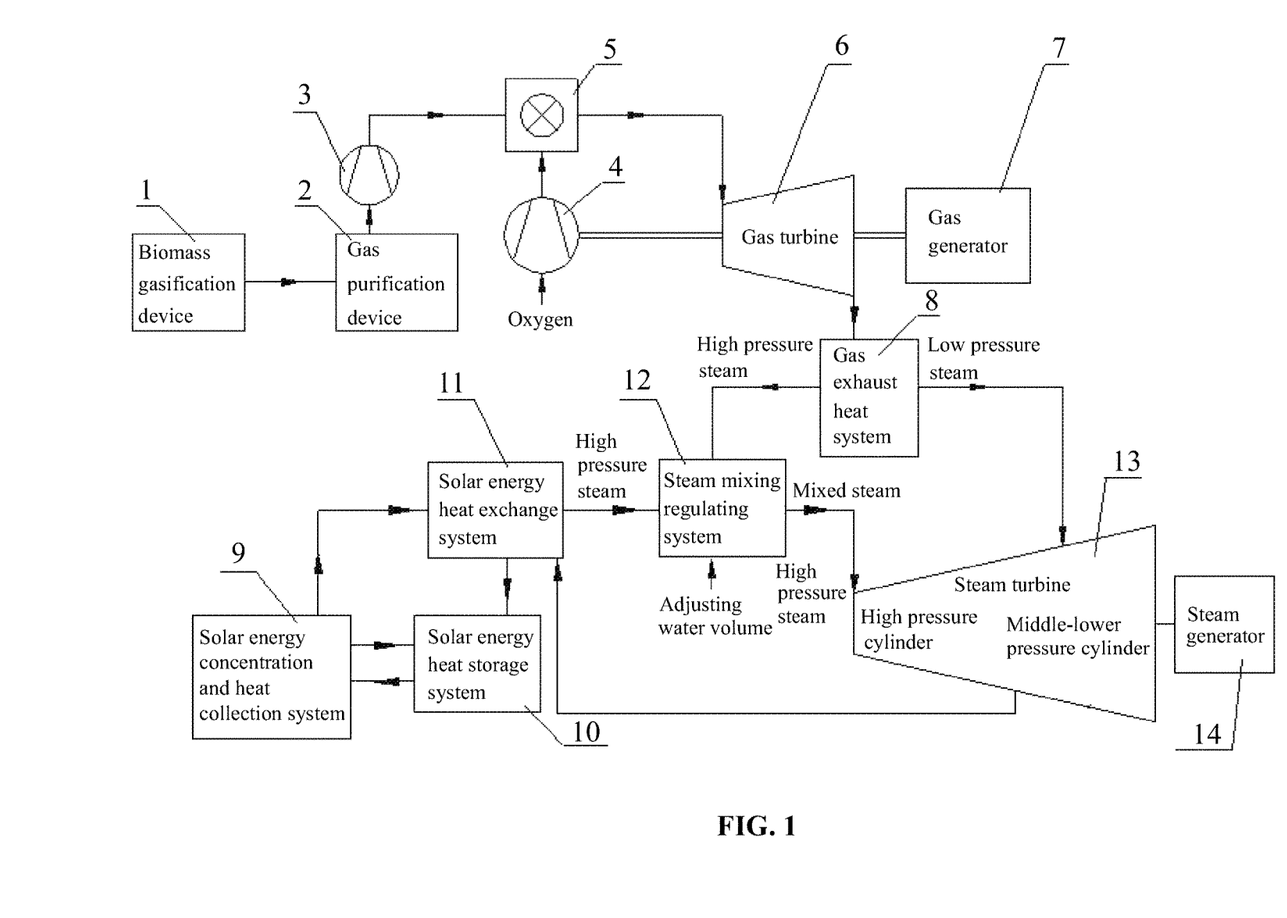
FIG. 1 is a diagram showing main devices and process of a power generation system integrated with solar energy and BIGCC.

As shown in FIG. 1, a power generation system integrated with solar energy and BIGCC, the system comprises: a solar energy concentration system 9, a biomass gasification device 1, a gas-powered generator 7, a steam turbine 13, and a steam-powered generator 14. The steam turbine 13 comprises: a first cylinder, a second cylinder, and a third cylinder; and pressures of the first cylinder, the second cylinder, and the third cylinder respectively decrease. The solar energy concentration system 9 is configured to concentrating the light and the heat from the sun and is connected to a solar energy heat exchange system 11. The biomass gasification device 1 is configured to produce a synthetic gas by gasifying biomass. The biomass gasification device 1 is connected to the gas-powered generator 7 via a first gas compressor 3, a combustion chamber 5, and a gas turbine 6. A gas outlet of the gas turbine 6 is also connected to a gas exhaust heat system 8. The gas exhaust heat system 8 comprises a first steam outlet and a second steam outlet; and a pressure of the first steam outlet is higher than a pressure of the second steam outlet. The second steam outlet of the gas exhaust heat system 8 is connected to a second cylinder and a third cylinder of the steam turbine 13. The first steam outlet of the gas exhaust heat system 8 and a steam outlet of the solar energy heat exchange system 11 are connected to a steam mixing regulating system 12. A mixed steam outlet of the steam mixing regulating system 12 is connected to a first cylinder of the steam turbine 13. 2 is a gas purification device, and 4 is a second gas compressor. A solar energy heat storage system 10 is configured to connect to the solar energy heat exchange system 11 and the solar energy concentration system 9, respectively.

Figure 3:
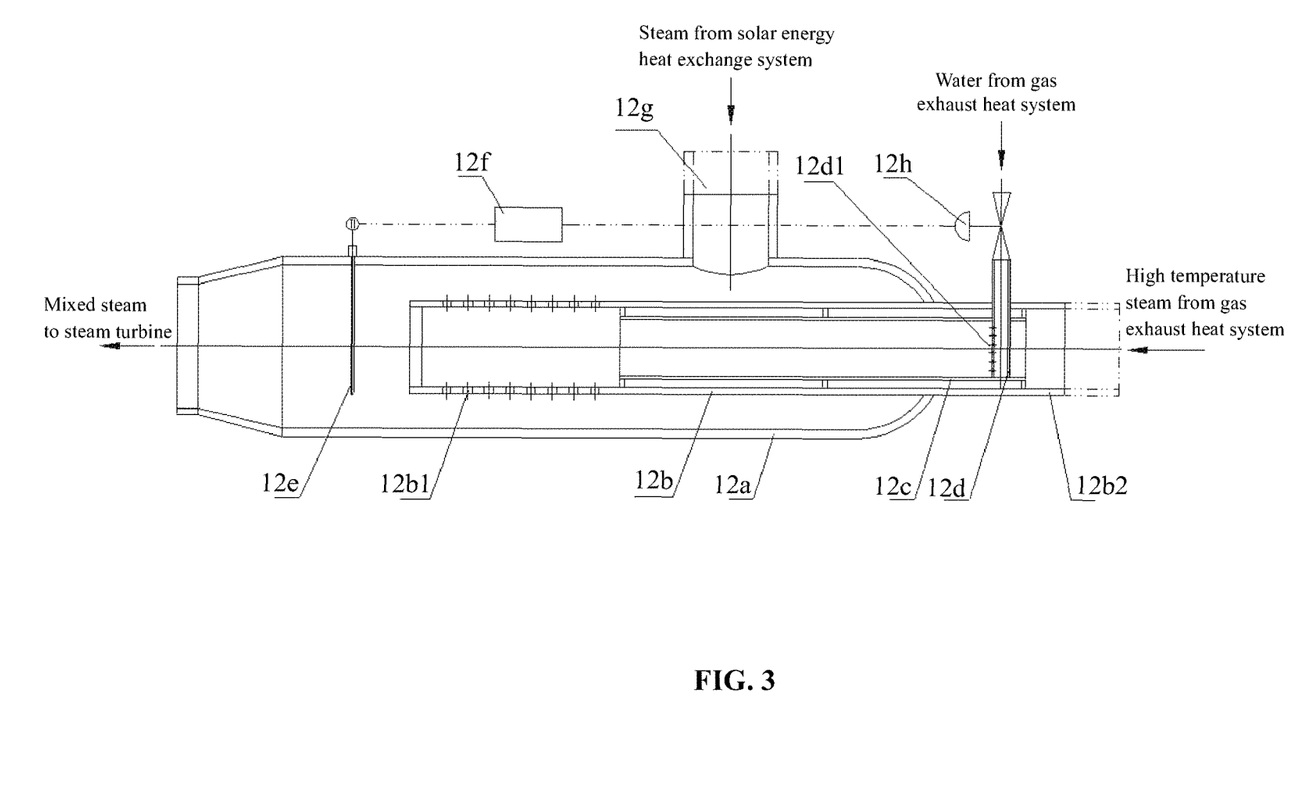
FIG. 3 is a structure diagram of a steam mixing regulating system of FIG. 1.

FIG. 3 is a structure diagram of a steam mixing regulating system.

The steam mixing regulating system 12 comprises a mixer housing 12a. A steam ejection pipe 12b is protruded from a rear end of the mixer housing 12a into a middle-front part of a cavity of the mixer housing 12a. A front end of the steam ejection pipe 12b is sealed, steam nozzles 12b1 are distributed on a front part of a pipe wall of the steam ejection pipe 12b, and a first steam inlet 12b2 for introducing in steam from the gas exhaust heat system is disposed at a rear end of the steam ejection pipe 12b. A water ejection pipe 12d is installed inside the first steam inlet 12b2 in a rear part of the steam ejection pipe 12b. Water nozzles 12d1 are distributed on a part of the water ejection pipe 12d extended into the steam ejection pipe 12b, an inlet of the water ejection pipe 12d is disposed at an end thereof outside the steam ejection pipe 12b and connected to a solenoid valve 12h. An outer wall of a rear part of the mixer housing 12a is provided with a second steam inlet 12g for introducing in steam from the solar energy heat exchange system. A temperature detector 12e is disposed on an outer wall of a front part of the mixer housing 12a. A probe of the temperature detector 12e is extended into the cavity of the mixer housing 12a. A signal wire of the temperature detector 12e is connected to a temperature controller 12f. A control output terminal of the temperature controller 12f is connected to the solenoid valve 12h disposed at the end of the water ejection pipe 12d outside the steam ejection pipe 12b. A front end of the mixer housing 12a is the mixed steam outlet.

A liner tube 12c is disposed in a middle-rear part of the steam ejection pipe 12b. The liner tube 12c is disposed between the first steam inlet and a distributed region of the steam nozzles 12b1. An arranged area of the steam nozzles 12b1 is approximately one third of the steam ejection pipe 12b. An arranged area of the liner tube 12c is approximately two thirds of the steam ejection pipe 12b, and outer rings at two ends of the liner tube 12c are sealed from the mixer housing 12a.

A steam output from the first steam outlet of the gas exhaust heat system has a pressure of 10 megapascal or 3.82 megapascal and a temperature of 485° C. A steam output from the steam outlet of the solar energy heat exchange system has a pressure of 10 megapascal or 3.82 megapascal and a temperature of 390° C. A mixed steam supplied to the steam turbine has a temperature of 435° C.

The mixed gas is regulated as follows: generally, the temperature of the mixed steam does not exceed 450° C., which satisfies the requirements on the inlet steam of the steam turbine. In conditions of weak sunlight or in the absence of the sunlight, the flow of the solar energy photothermal steam is relatively small, and the temperature of the mixed gas may exceed 450° C. By measuring the temperature of the mixed gas and automatically regulating the water flow in the water ejection pipe, the regulation and the control of the temperature of the mixed gas are realized.

The steam output from the first steam outlet of the gas exhaust heat system enters the steam ejection pipe 12b, and axially flows inside the steam ejection pipe 12b, during which, the steam passes through the water ejection pipe 12d and the liner tube and is then ejected via the steam nozzles 12b1 radically arranged on the steam pipe 12b. The solar energy photothermal steam enters the steam mixing regulating system via the second steam inlet, flows axially in the steam mixing regulating system, and is mixed with the steam output from the first steam outlet of the gas exhausted heat system. The temperature of the mixed steam is measured by the temperature detector 12e and then sent to a temperature controller 12f. By computing process, the variation trend of the temperature of the mixed gas is obtained by the temperature controller 12f, and it is determined whether the steam temperature is too high or too low. Thereafter, the solenoid valve for controlling the water is adjusted to execute the action of on, off, increase, or decrease of the water flow.

The effect of the steam mixing regulating system is as follows:

1. The steam mixing regulating system realizes a combination of the solar energy heat and the Rankine cycle of steam of the BIGCC, thus overcoming problems that the exhaust heat boiler or the steam turbine is unable to separately accomplish the combined objective.

2. Two steams of different temperatures are mixed into a steam of the same parameter, satisfying the requirements on the gas parameters of the gas turbine;

3. The gas inlet system and structure of the gas turbine are simplified, thus saving the production cost of the turbine device.

4. A large fluctuation of the gas temperature is prevented from shocking the turbine, thus ensuring safe and stable operation of the turbine.

Figure 2:
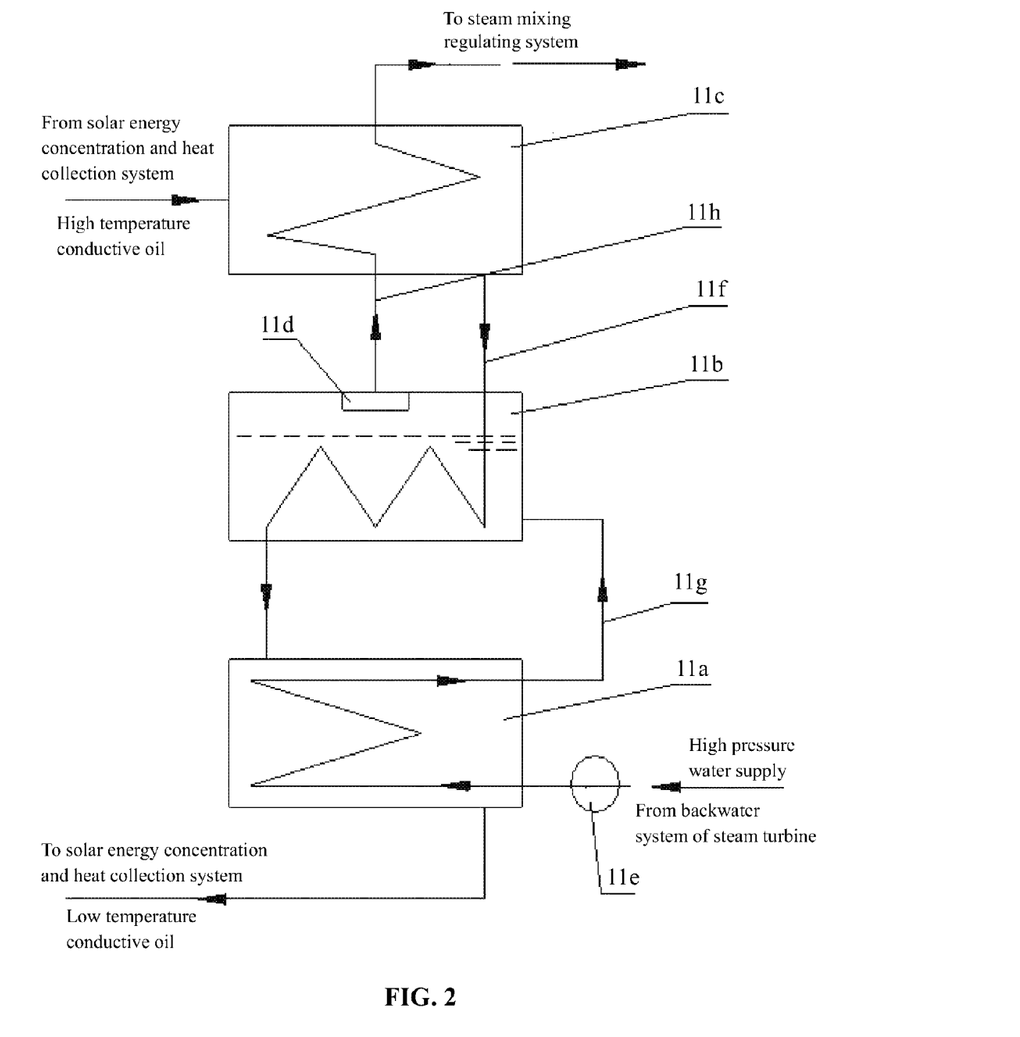
FIG. 2 is a structure diagram of a solar energy heat exchange system of FIG. 1.

FIG. 2 is a structure diagram of a solar energy heat exchange system.

The solar energy heat exchange system 11 comprises: a heater 11a, an evaporator 11b, and a superheater 11c. The superheater 11c is connected to a conductive oil system of the solar energy concentration system 9. An oil pipe 11f passes through the evaporator 11b and the heater 11a. An oil outlet of the heater 11a is connected to an oil return port of the conductive oil system of the solar energy concentration system 9. A water pipe 11g is disposed inside the heater 11a, and the water pipe 11g is connected to an internal of the evaporator 11b. A steam-water separator 11d is disposed at an upper end of the evaporator 11b. A steam outlet of the steam-water separator 11d is connected to a steam pipe 11h, the steam pipe 11h passes through the superheater 11c, and an outlet of the steam pipe is connected to the steam mixing regulating system 12.

Working process of the solar energy heat exchange system is as follows: water from a water supply pump 11e enters the heater 11a, where water absorbs heat quantity until approaching a saturated state. The saturated water then enters the evaporator 11b, where the water is heated, converted into saturated steam, and separated by the steam-water separator 11d. The saturated steam is introduced to the superheater 11c and the saturated water is returned and continued evaporation. The saturated steam is heated into superheated steam of a temperature of approximately 390° C. by the superheater 11c and the superheated steam is then discharged from the steam pipe 11h. The heat source of the heat exchange system is from the solar energy concentration system. A conductive oil is transported to the superheater 11 by the oil pipe, then to the evaporator 11b and the heater 11a respectively, to convey the carried heat quantity to the steam and the water and then be transformed into conductive oil of lower temperature. The conductive oil after heat release passes through the oil pipe and is introduced to the light field heat gathering system for further heating. Thus, the heat exchange process of the light and the heat of the solar energy is completed by such repeated cycles.

The gasification of the biomass raw material is finished in the biomass gasification device to produce a crude gas. The crude gas is transported to the gas purification device 2 for purification treatments including washing, cooling, dust removing, and desulfurization to remove impurities including dusts and sulfides from the crude gas, a clean gas is then compressed by the first gas compressor 3 and introduced to the combustion chamber 5. In another path, oxygen gas prepared by an oxygen preparing device is compressed by the Second gas compressor 4 and introduced to the combustion chamber 5, so that the fuel gas is combusted in the combustion chamber 5 in the presence of the oxygen gas. The produced flue gas enters the gas turbine 6 and does work by expansion, the gas power generator 7 is driven for power generation, thus Brayton cycle of the gas turbine is accomplished and the power generation process of the gas turbine is realized.

The flue gas discharged from the gas turbine 6 is introduced to the gas exhaust heat system 8 and heat exchange is performed among the flue gas and heating surfaces of a first pressure and a second pressure in the gas exhaust heat system, in which, the first pressure is higher than the second pressure, to produce steams of the first pressure and the second pressure. The steam of the first pressure has a temperature of between 450 and 485° C., and enters the first cylinder of the steam turbine 13 as a primary steam after being mixed with the photothermal steam and temperature regulation. The steam of the second pressure is adopted as a supplementary steam to enter the third cylinder of the steam turbine to do work while expanding, thus driving the generator 14 to generate power and realizing the power generation process of the Rankine cycle of the steam.

The solar energy concentration system 9 is arranged in parallel to the gas exhaust heat system and includes a parabolic concentrator, an evacuated collector tube, a light field bracket, a tracking driving device, and the conductive oil system. According to the light source condition and the set photothermal generation capacity and the time for energy storage, the area of the condenser field and the number of the collector tubes are determined, and the radiation energy of the sun is converted into the heat energy of the conductive oil by light concentration and heat collection. In the day time, one part of the conductive oil is directly introduced to the solar energy heat exchange system 11 where the heat exchange is performed between the conductive oil and the water and steam to produce steam of a temperature of 390° C. Another part of the conductive oil exchanges heat with the solar energy heat storage system 10 to preserve excess heat energy in the heat storage system 10. In nocturnal period, the solar energy heat storage system 10 releases heat to satisfy the required heat quantity for power generation. The conductive oil cooled in the solar energy heat exchange system 11 is then returned to the solar energy heat collecting system 9 where the conductive oil is reheated for subsequent cycle.

In diurnal period, one part of the conductive oil is directly introduced to the solar energy heat exchange system to exchange heat with the water and the steam. A steam output from the first steam outlet of the gas exhaust heat system and the steam output from the steam outlet of the solar energy heat exchange system are mixed in the steam mixing regulating system 12. To prevent large amplitude fluctuation of the temperature of the mixed steam and to avoid the shock of the thermal stress on the steam turbine, the flows of the two paths of steams and the mixing temperature are monitored. The temperature of the mixed steam is controlled within a range of between 400 and 450° C. under the action of the steam temperature regulator assisted by the water ejection regulation, besides, the steam temperature presents stable variation in gradual increase or decrease trend, thus satisfying the requirements of steam intake on the steam turbine 13.

The solar energy heat storage system primarily includes a first tank, a second tank, an oil-salt heat exchanger, a molten salt pump, and an associated pipe system. In day time or periods of strong sunlight, in addition to a part of the light and the heat are directly supplied for power generation, most of the light and the heat pass through the oil-salt heat exchanger and heat a molten salt medium in the second tank to a set temperature, and the molten salt medium is then transported to the first tank for storage. In the night or periods of weak sunlight when the light field is unable to satisfy the heat quantity required for power generation, the energy is supplied by the heat storage system via heat release. The molten salt medium in the first tank is pumped and returned to the oil-salt heat exchanger to heat the conductive oil of the light field. The heat quantity is returned by the conductive oil for power generation, and the cooled molten slat is transported to the second tank for storage.

Thus, by repeated cycle, the photothermal release and storage functions are accomplished.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A power generation system, the system comprising:
a) a solar energy concentration system;
b) a biomass gasification device;
c) a gas-powered generator;
d) a steam turbine, the steam turbine comprising a first cylinder, a second cylinder, and a third cylinder; pressures of the first cylinder, the second cylinder, and the third cylinder respectively decreasing;
e) a steam-powered generator;
f) a solar energy heat exchange system, the solar energy heat exchange system comprising a steam outlet;
g) a first compressor;
h) a combustion chamber;
i) a gas turbine, the gas turbine comprising a gas outlet;
j) a gas exhaust heat system, the gas exhaust heat system comprising a first steam outlet and a second steam outlet, and a pressure of the first steam outlet being higher than a pressure of the second steam outlet; and
k) a steam mixing regulating system, the steam mixing regulating system comprising a mixed steam outlet;
wherein
the solar energy concentration system is connected to the solar energy heat exchange system; the biomass gasification device is connected to the gas-powered generator via the first gas compressor, the combustion chamber, and the gas turbine; the gas outlet of the gas turbine is connected to the gas exhaust heat system; the second steam outlet of the gas exhaust heat system is connected to the second and the third cylinders of the steam turbine; the first steam outlet of the gas exhaust heat system and the steam outlet of the solar energy heat exchange system are connected to the steam mixing regulating system; and the mixed steam outlet of the steam mixing regulating system is connected to the first cylinder of the steam turbine.

2. The system of claim 1, wherein
the steam mixing regulating system comprises a mixer housing; a steam ejection pipe is protruded from a rear end of the mixer housing into a middle-front part of a cavity of the mixer housing; a front end of the steam ejection pipe is sealed, steam nozzles are distributed on a front part of a pipe wall of the steam ejection pipe, and a first steam inlet for introducing in steam from the gas exhaust heat system is disposed at a rear end of the steam ejection pipe; a water ejection pipe is installed inside the first steam inlet in a rear part of the steam ejection pipe; water nozzles are distributed on a part of the water ejection pipe extended into the steam ejection pipe, and an inlet of the water ejection pipe is disposed at an end thereof outside the steam ejection pipe and connected to a solenoid valve;
a second steam inlet for introducing in steam from the solar energy heat exchange system is disposed on an outer wall of a rear part of the mixer housing;
a temperature detector is disposed on an outer wall of a front part of the mixer housing; a probe of the temperature detector is extended into the cavity of the mixer housing; a signal wire of the temperature detector is connected to a temperature controller; a control output terminal of the temperature controller is connected to the solenoid valve disposed at the end of the water ejection pipe outside the steam ejection pipe; and a front end of the mixer housing is the mixed steam outlet.

3. The system of claim 2, wherein a liner tube is disposed in a middle-rear part of the steam ejection pipe; the liner tube is disposed between the first steam inlet and a distributed region of the steam nozzles; and outer rings at two ends of the liner tube are sealed from the mixer housing.

4. The system of claim 1, wherein
the solar energy heat exchange system comprises: a heater, an evaporator, and a superheater; the superheater is connected to a conductive oil system of the solar energy concentration system; an oil pipe passes through the evaporator and the heater; an oil outlet is disposed on the heater and connected to an oil return port of the conductive oil system of the solar energy concentration system; and
a water pipe is disposed inside the heater, and the water pipe is connected to an internal of the evaporator; a steam-water separator is disposed at an upper end of the evaporator; and a steam outlet of the steam-water separator is connected to a steam pipe, the steam pipe passes through the superheater, and an outlet of the steam pipe is connected to the steam mixing regulating system.

5. The system of claim 2, wherein
the solar energy heat exchange system comprises: a heater, an evaporator, and a superheater; the superheater is connected to a conductive oil system of the solar energy concentration system; an oil pipe passes through the evaporator and the heater; an oil outlet is disposed on the heater and connected to an oil return port of the conductive oil system of the solar energy concentration system;
a water pipe is disposed inside the heater, and the water pipe is connected to an internal of the evaporator; a steam-water separator is disposed at an upper end of the evaporator; and a steam outlet of the steam-water separator is connected to a steam pipe, the steam pipe passes through the superheater, and an outlet of the steam pipe is connected to the steam mixing regulating system.

6. The system of claim 3, wherein
the solar energy heat exchange system comprises: a heater, an evaporator, and a superheater; the superheater is connected to a conductive oil system of the solar energy concentration system; an oil pipe passes through the evaporator and the heater; an oil outlet is disposed on the heater and connected to an oil return port of the conductive oil system of the solar energy concentration system; and
a water pipe is disposed inside the heater, and the water pipe is connected to an internal of the evaporator; a steam-water separator is disposed at an upper end of the evaporator; and a steam outlet of the steam-water separator is connected to a steam pipe, the steam pipe passes through the superheater, and an outlet of the steam pipe is connected to the steam mixing regulating system.

7. The system of claim 1, wherein a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

8. The system of claim 2, wherein a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

9. The system of claim 3, wherein a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

10. The system of claim 4, wherein a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

11. The system of claim 5, wherein a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

12. The system of claim 6, wherein a steam output from the first steam outlet of the gas exhaust heat system has a pressure of 10 megapascal or 3.82 megapascal and a temperature of 485° C.; a steam output from the steam outlet of the solar energy heat exchange system has a pressure of 10 megapascal or 3.82 megapascal and a temperature of 390° C.; and a mixed steam supplied to the steam turbine has a temperature of 435° C.

13. The system of claim 1, wherein further comprising a solar energy heat storage system; and the solar energy heat storage system is respectively connected to the solar energy heat exchange system and the solar energy concentration system.

14. The system of claim 2, wherein further comprising a solar energy heat storage system; and the solar energy heat storage system is respectively connected to the solar energy heat exchange system and the solar energy concentration system.

15. The system of claim of claim 3, wherein further comprising a solar energy heat storage system; and the solar energy heat storage system is respectively connected to the solar energy heat exchange system and the solar energy concentration system.

16. The system of claim of claim 4, wherein further comprising a solar energy heat storage system; and the solar energy heat storage system is respectively connected to the solar energy heat exchange system and the solar energy concentration system.

17. The system of claim of claim 5, wherein further comprising a solar energy heat storage system; and the solar energy heat storage system is respectively connected to the solar energy heat exchange system and the solar energy concentration system.

18. The system of claim of claim 6, wherein further comprising a solar energy heat storage system; and the solar energy heat storage system is respectively connected to the solar energy heat exchange system and the solar energy concentration system.

19. The system of claim of claim 7, wherein further comprising a solar energy heat storage system; and the solar energy heat storage system is respectively connected to the solar energy heat exchange system and the solar energy concentration system.

20. The system of claim of claim 8, wherein further comprising a solar energy heat storage system; and the solar energy heat storage system is respectively connected to the solar energy heat exchange system and the solar energy concentration system.

\* \* \* \* \*